May 19, 1931. J. F. SCHMIDT ET AL 1,806,267
CONNECTER
Filed Sept. 29, 1927   2 Sheets-Sheet 2
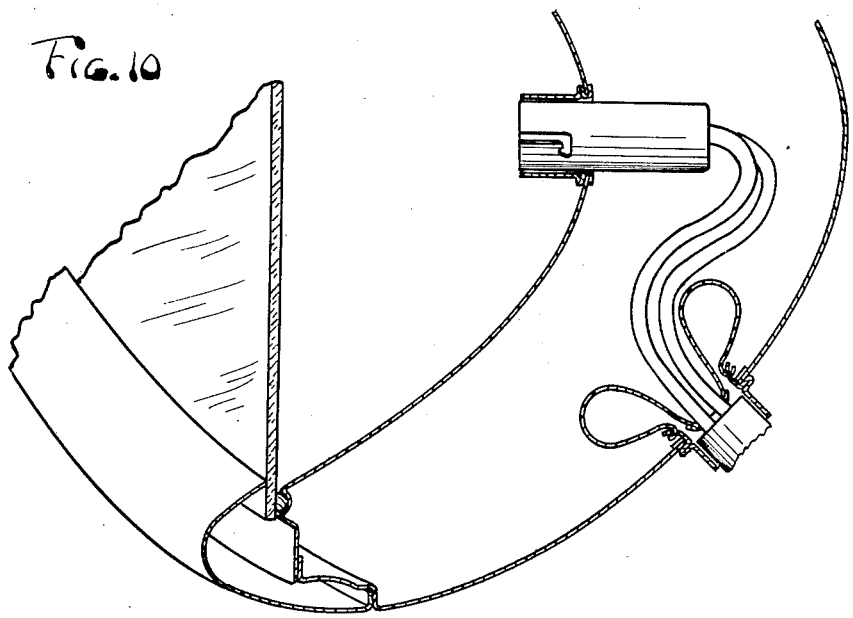
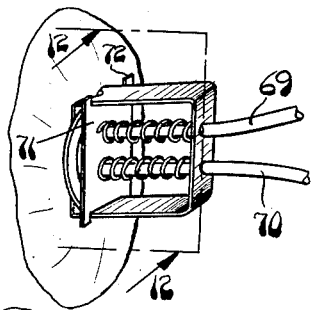
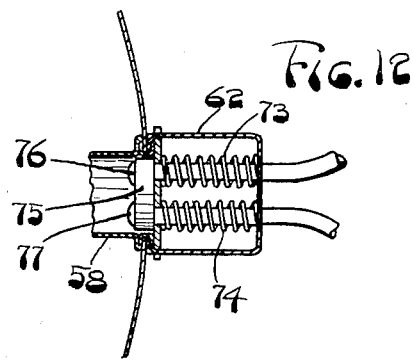
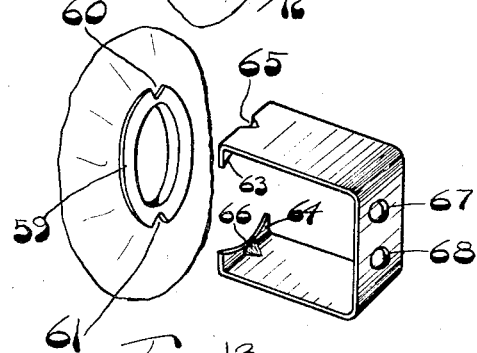
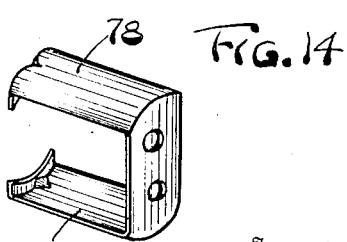

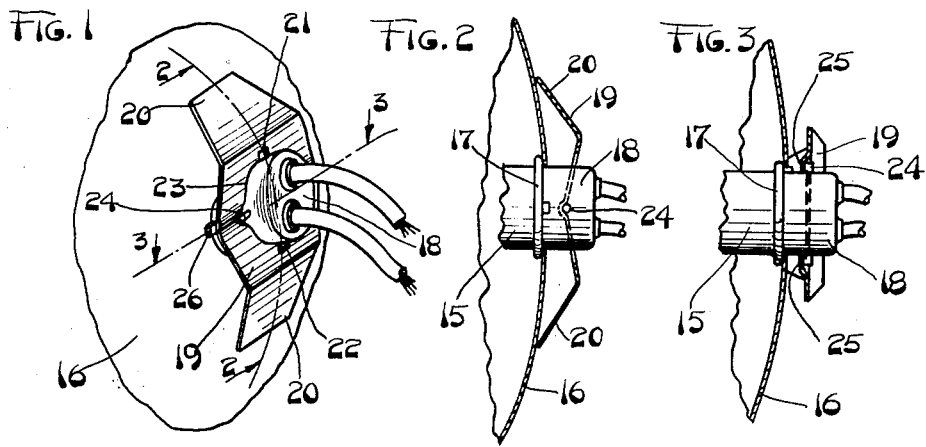
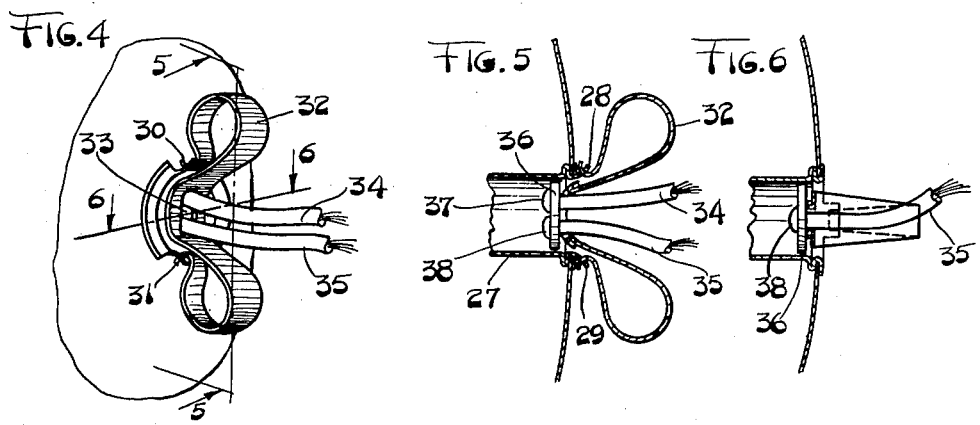
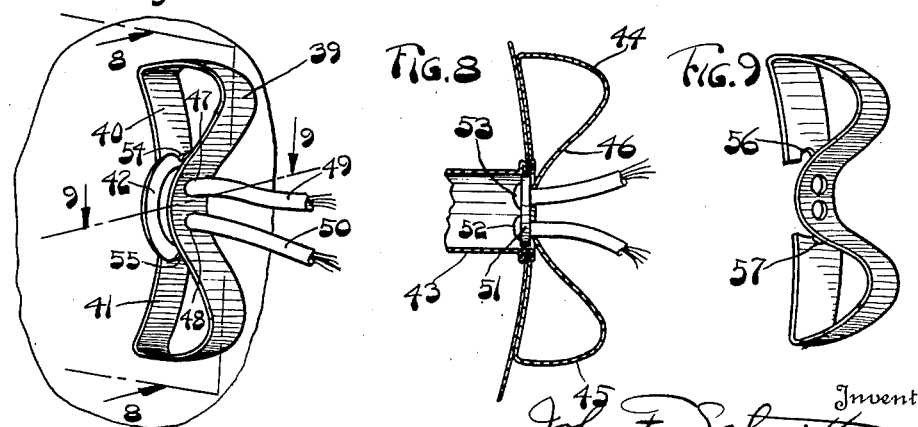

Patented May 19, 1931

1,806,267

UNITED STATES PATENT OFFICE

JOHN F. SCHMIDT, LOUIS F. ERHART, AND OSCAR E. WRIGHT, OF CINCINNATI, OHIO, ASSIGNORS TO THE THOS. J. CORCORAN LAMP CO., OF CINCINNATI, OHIO, A CORPORATION OF OHIO

CONNECTER

Application filed September 29, 1927. Serial No. 222,890.

This invention relates particularly to and has for an object to produce a type of connecter which is especially adapted to usage in the type of reflector equipped lamps employed as automobile head lamps, in which no focusing adjustment is necessitated.

A further object is to produce a connecter in which improved and very materially simplified means are employed for retaining the connecter parts within the mounting shell, casing or tubing, and for retaining such parts therein yieldingly and demountably.

These and other objects are attained in the invention which we have described in the following specification and which has been illustrated in the various forms in the accompanying drawings, in which:

Fig. 1 is a fragmental perspective view of one form of our invention.

Fig. 2 is a sectional view of the form shown in Fig. 1, and taken on the line 2—2 thereof.

Fig. 3 is a sectional view of the form shown in Fig. 1, and taken on the line 3—3 thereof.

Fig. 4 is a fragmental perspective view of another form of our invention.

Fig. 5 is a sectional view taken on the line 5—5 of Fig. 4.

Fig. 6 is a sectional view taken on the line 6—6 of Fig. 4.

Fig. 7 is a fragmental perspective view of another form of our invention.

Fig. 8 is a sectional view taken on the line 8—8 of Fig. 7.

Fig. 9 is a sectional view taken on the line 9—9 of Fig. 7.

Fig. 10 is a fragmental perspective view of a lamp equipped with a form of our invention illustrating its application to a different position than that which we have shown in the foregoing illustrations.

Fig. 11 is a perspective view of still another form of our invention.

Fig. 12 is a sectional view of the form of the invention shown in Fig. 11 and taken on the line 12—12 thereof.

Fig. 13 is a composite perspective view showing details of the form of the invention disclosed in Fig. 11.

Fig. 14 is a perspective view showing a modified form of one of the details shown in Fig. 13.

As in all the forms of the invention as we have shown it, the forms shown in Figs. 1, 2 and 3 are constructed so that the connecter 15 is mounted in the reflector 16 fixedly. This is accomplished by providing the connecter shell with a flange 17 which while permitting the rear end 18 of the connecter to enter the reflector opening, limits its position therein. In order to hold the connecter in this position a leaf spring 19 has been provided, the center of the spring being provided with an opening 23 to receive the connecter, with the ends 20 bent down to engage the back of the reflector. At diametrically opposite points in alignment with the ends 20, we have provided notches 21 and 22 in the edge of the opening 23. These are to receive a pair of pins 24 which are mounted in the connecter shell and which are placed close enough to the flange 17 to necessitate quite a compression of spring 19 in order to let them pass through notches 21 and 22 in placing spring 19 in position. In their normal positions the pins 24 occupy diammetrically disposed depressions 25 in the spring, which occupy transverse or right angle positions to those occupied by the notches 21 and 22. In addition to these the reflector is notched to receive a lug 26 located in the connecter shell, so that a positive position of the connecter against rotation is assured. This is essential because it is necessary that the bulb filament be held permanently in a certain position.

The operation of assembling the connecter in the reflector consists in bringing the connecter through the reflector from the front or inside, so that the lug 26 of the connecter engages the reflector notch provided for it. This permits the flange 17 of the connecter to engage the inner surface of the reflector as shown in Figs. 2 and 3. Then spring 19 is placed over the connecter shell with its notches 21 and 22 in register with the pins 24 of the connecter. By depressing the spring against the outer face of the reflector, the notches are brought below pins 24.

Then the spring is turned at right angles to permit the pins to occupy the depressions 25 when it is released. This retains the springs in position and holds the connecter firmly with its flange against the inner face of the reflector.

In the form shown in Figs. 4, 5 and 6 the connecter shell 27 is fixedly crimped or otherwise fastened in the opening of the reflector. The shell 27 extends within the reflector and its rear crimped over edge is provided with two ears 28 and 29. These ears are perforated to receive the ends 30 and 31 of a spring 32 which is shaped somewhat like a double ogee curve. This shape places the middle of the spring against or extending slightly within and substantially closing the rear open end of the connecter shell. The central portion is provided with a slot 33 through which the connecter terminal wires 34 and 35 extend. These wires are mounted within an insulating washer 36 and are provided with contact heads 37 and 38 against which the bulb terminals bear. Because of the inwardly extending position of the central portion of spring 32, any pressure which is brought to bear upon contacts 37 and 38 will cause washer 36 to force spring 32 outwardly yieldingly and thus permit the bulb to be placed within the socket and locked therein as usual, because of the yielding mounting of this contact assembly.

For purposes of replacement or repair it is a simple matter merely to disengage or unhook the ends of the spring from their ears 28 and 29. This permits the contact assembly comprising wires 34 and 35, washer 36 and contacts 37 and 38 to be entirely withdrawn.

In Figs. 7, 8 and 9 an idea somewhat similar to that shown in Figs. 4 to 6 inclusive is disclosed. By this is meant that it is somewhat similar as to operation, although in structural features it also resembles the construction just described. For example, the spring 39 closely resembles the spring 32. However, the manner of fastening the spring is different. Portions 40 and 41 of the spring are bent to and are held to lie against the back of the reflector by having these end portions snapped under the flange 42 by which the connecter tube 43 is crimped to fixed position on the reflector. From these portions 40 and 41 the loops 44 and 45 of the spring extend, with the central portion 46 pressing against or slightly into the connecter shell or tube at the rear. Apertures 47 and 48 in this central portion pass the wires 49 and 50 which are mounted in the reciprocating washer 51 and the ends of which form the terminals or contacts 52 and 53, thereby yieldingly mounting this contact assembly.

Thus, as in the previously described construction the contact assembly containing contacts 52 and 53 is held yieldingly and operates to press against the bulb contact in order to retain the bulb in the socket. Incidentally also, may be pointed out that the flange 42 of the connecter shell is provided with diametrically opposite depressions 54 and 55 which are received by the notches 56 and 57 in the ends 40 and 41 of the spring, so that proper position of the spring and consequently of the contacts 52 and 53 is maintained for the terminals of the bulb located in the socket or connecter shell 43. It is merely necessary to snap the spring 44 out of the position shown, in order that the complete connecter parts may be removed for repair, replacement and the like.

Fig. 10 shows a construction resembling that shown in Fig. 4, but instead of applying it to the mounting of a lamp bulb in the reflector, the application is made to the lamp body where the circuit connection is made to the entire lamp. Any of the other constructions we have shown may as readily be used in this position if desired.

Figs. 11 and 12 show an idea which is to accomplish the same results as are accomplished in the forms we have previously described, but which is slightly more complicated. The socket or connecter shell 58 is crimped in the reflector by means of a flange 59 in which depressions or notches 60 and 61 are formed. A U shaped clip 62 is provided with inturned fingers 63 and 64 adapted to engage beneath the flange 59 at the region of the notches 60 and 61. Adapted to engage the notches 60 and 61 are inwardly extending humps 65 and 66 which operate to retain the clips in position against rotary displacement. Holes 67 and 68 in the clip permit the reciprocal passage of the two circuit wires 69 and 70 of the contact assembly, which contains a plate 71 reciprocally mounted between the clip branches, and having guiding projections 72 to prevent its displacement. Between this plate and back of the clip are located coil springs 73 and 74 upon the respective wires 69 and 70 so as to hold the plate forwardly against the connecter shell flange 59. On the inner ends of the wires 69 and 70 is mounted an insulating washer 75, with terminal contacts 76 and 77 formed on the wires to retain the washer in place.

Thus, when a bulb is placed in the socket it is necessary to press it against the contacts in order to secure it within the socket. Therefore the springs exert a yielding pressure against the contact assembly and the bulb is retained in position as in the previously described forms. Disassembly is accomplished by merely snapping the clip from position, when the entire contact assembly is quickly removed for repairs, replacement and the like.

Fig. 14 merely shows a modified clip of the type shown at 62 just described. The only difference is that the clip in Fig. 14 has its branches 78 and 79 curved transversely to conform to the curvature of the flange 59. This merely has the effect of causing the clip to be stiffer than the clip 62, otherwise its functions are not changed in any respect.

Having thus described our invention what we claim is:

1. A connecter in combination with a mounting element, comprising a connector shell having a flange at its rear end crimped upon the mounting element and arranged for attaching the ends of a spring thereto, a bulb contact in the shell, and a spring having its ends attached to the shell flange and adapted between its ends yieldingly to retain the contact within the shell.

2. A connecter in combination with a mounting element, comprising a connecter shell secured to the mounting element, contacts within the shell, and a spring having bent ends held by the shell and between its ends retaining the contacts within the shell yieldingly.

3. A connecter in combination with a mounting element, comprising a connecter shell secured to the mounting element, an insulator movable within the shell, contacts on the insulator, and a spring held at its ends by the shell and between its ends supporting the insulator.

4. A connecter in combination with a mounting element, containing a contact assembly in association with a retaining spring, said spring being held with its ends stationary relatively to the mounting element and associated between its ends with the contact assembly whereby the contact assembly is retained yieldingly relatively to the mounting element.

In testimony whereof we have hereunto affixed our signatures.

JOHN F. SCHMIDT.
LOUIS F. ERHART.
OSCAR E. WRIGHT.